United States Patent
Harris et al.

(10) Patent No.: US 12,343,611 B2
(45) Date of Patent: Jul. 1, 2025

(54) CONTROL PANEL MOUNT FOR EXERCISE MACHINE

(71) Applicant: Equip Products, Inc., Saint Jacob, IL (US)

(72) Inventors: Mark Harris, Saint Jacob, IL (US); Devin Pace, Manassas, VA (US)

(73) Assignee: Equip Products, Inc., Saint Jacob, IL (US)

( * ) Notice: Subject to any disclaimer, the term of this patent is extended or adjusted under 35 U.S.C. 154(b) by 350 days.

(21) Appl. No.: 18/104,581

(22) Filed: Feb. 1, 2023

(65) Prior Publication Data

US 2023/0271075 A1     Aug. 31, 2023

Related U.S. Application Data

(60) Provisional application No. 63/313,994, filed on Feb. 25, 2022.

(51) Int. Cl.
*A63B 71/06* (2006.01)

(52) U.S. Cl.
CPC ...... *A63B 71/06* (2013.01); *A63B 2071/0675* (2013.01)

(58) Field of Classification Search
CPC ............ A63B 71/06; A63B 2071/0675; A63B 2071/0658; A63B 71/0622; A63B 22/02; A63B 22/0605; A63B 2225/09; F16M 11/10; F16M 13/02; F16M 2200/06; F16M 11/2014; F16M 11/2028; F16M 11/2085; F16M 11/24
See application file for complete search history.

(56) References Cited

U.S. PATENT DOCUMENTS

| | | | | |
|---|---|---|---|---|
| 6,739,654 B1* | 5/2004 | Shen | ................... | B60R 11/0235 |
| | | | | 297/188.05 |
| 7,114,218 B1* | 10/2006 | Lin | ........................ | G06F 1/1681 |
| | | | | 16/342 |
| 7,334,765 B2* | 2/2008 | Hwang | .............. | F16M 11/2092 |
| | | | | 248/923 |
| 7,399,033 B2* | 7/2008 | Hsiao | ................... | B60R 11/0235 |
| | | | | 248/921 |
| 7,413,152 B1* | 8/2008 | Chen | ................... | F16M 11/2021 |
| | | | | 248/176.1 |
| 7,445,583 B2* | 11/2008 | Chen | ................... | A63B 71/0622 |
| | | | | D8/380 |
| 7,448,583 B2* | 11/2008 | Kim | ........................ | F16M 13/02 |
| | | | | 248/278.1 |
| 7,766,288 B2* | 8/2010 | Kim | .................... | F16M 11/2064 |
| | | | | 248/176.1 |
| 11,969,643 B2* | 4/2024 | Chen | ................... | F16M 11/2014 |
| 2007/0219056 A1* | 9/2007 | Lo | ........................ | G06F 1/1601 |
| | | | | 482/902 |

(Continued)

*Primary Examiner* — Garrett K Atkinson
(74) *Attorney, Agent, or Firm* — Thompson Coburn LLP

(57) ABSTRACT

A control panel mount for an exercise machine has an equipment mounting plate, an intermediate plate and a control panel mounting plate. The equipment mounting plate is adapted and configured to be mounted to the exercise machine. The control panel mounting plate is adapted and configured to be mounted to a control panel of the exercise machine. The equipment mounting plate is hingedly connected to the intermediate plate, and the intermediate plate is rotatably connected to the control panel mounting plate.

13 Claims, 13 Drawing Sheets

(56) References Cited

U.S. PATENT DOCUMENTS

| | | | |
|---|---|---|---|
| 2008/0093517 A1* | 4/2008 | Chen | A63B 22/0605 |
| | | | 482/57 |
| 2010/0077564 A1* | 4/2010 | Saier | A63B 22/0605 |
| | | | 16/242 |
| 2014/0146443 A1* | 5/2014 | Kuo | F16M 11/2064 |
| | | | 361/679.01 |
| 2018/0169476 A1* | 6/2018 | Shimada | A63B 24/0059 |
| 2022/0016511 A1* | 1/2022 | Rozo | A63B 71/0619 |
| 2022/0062736 A1* | 3/2022 | Farrell | A63B 71/0619 |
| 2022/0241665 A1* | 8/2022 | Dalebout | A63B 71/0036 |
| 2022/0339504 A1* | 10/2022 | Intonato | A63B 22/025 |
| 2023/0026251 A1* | 1/2023 | Tracy | F16M 11/105 |
| 2023/0181993 A1* | 6/2023 | Taylor | A63B 22/02 |
| | | | 482/1 |
| 2024/0198177 A1* | 6/2024 | Kruger | G09B 19/0038 |

* cited by examiner

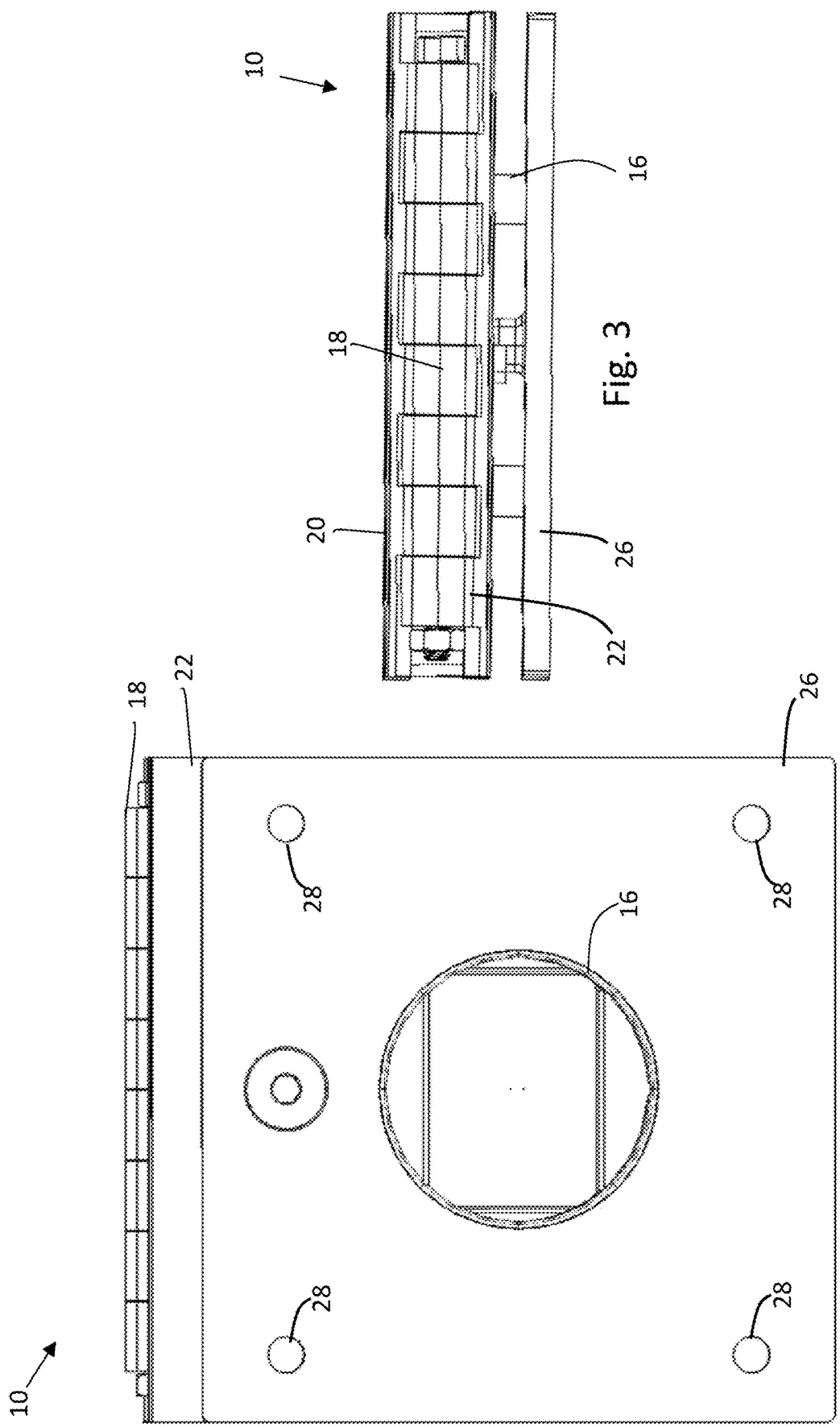

CONTROL PANEL MOUNT FOR EXERCISE MACHINE

CROSS-REFERENCE TO RELATED APPLICATIONS

This application claims priority to U.S. App. Ser. No. 63/313,994, filed on Feb. 25, 2022, the disclosure of which is incorporated by reference herein.

BACKGROUND

The disclosure is directed to a mount for a control panel, for instance, a control panel for an exercise machine, and a method of mounting the control panel to the exercise machine with the control panel mount.

DESCRIPTION OF DRAWINGS

FIG. 2 is a front view of the control panel mount with a mounting surface of a control panel mounting plate facing outward;

FIG. 3 is a top view of the control panel mount relative to FIG. 2;

DETAILED DESCRIPTION

It sometimes becomes necessary to alter the normal operation of exercise equipment, for instance, an exercise bike, to allow operation in different modes for modified exercise plans. For instance, one desiring to not use the pedals or the seat of an exercise bike but rather use the handles of the exercise bike for an arm or upper body workout, may desire to stand in front of the exercise bike and move the handles back and forth against the resistance provided by the exercise bike. Para-athletes may also desire to operate the exercise bike without sitting on the seat and operating the pedals but instead using the handles in a back-and-forth motion against the resistance provided by the exercise bike. This alternate mode of operation of the exercise equipment becomes difficult when the control panel is oriented for use by a user sitting on the seat.

Figure 19:
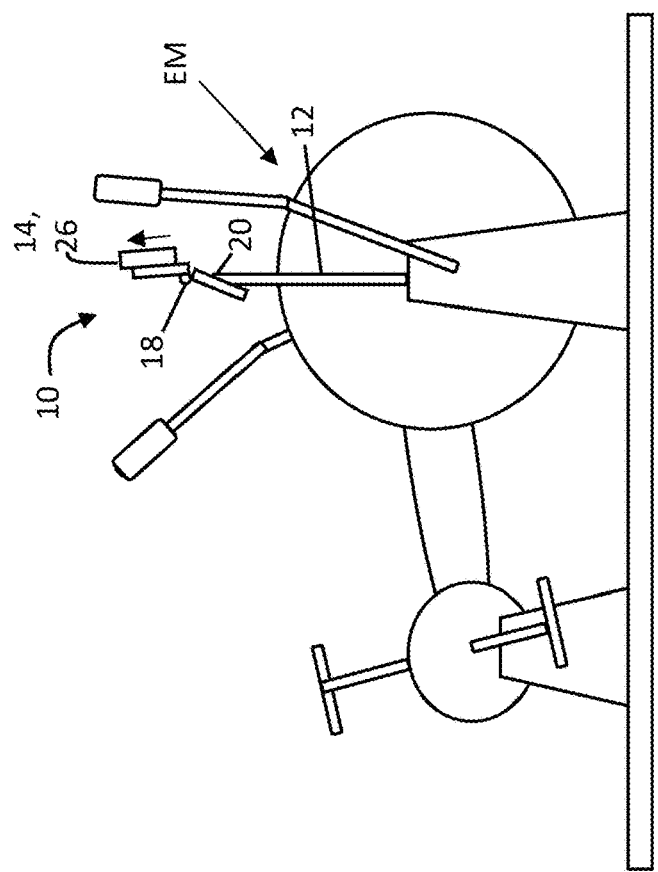
Figure 18:
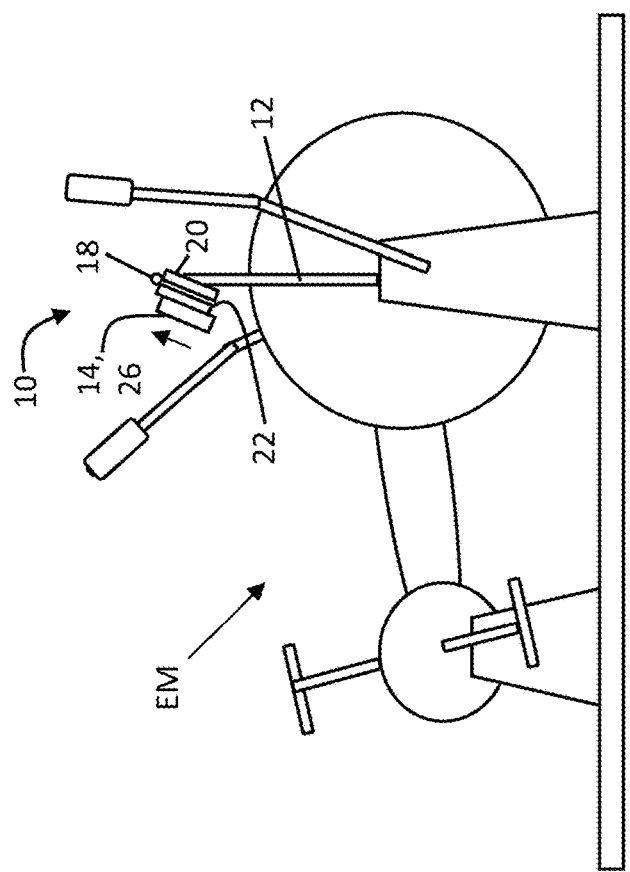

This disclosure is directed to a control panel mount 10 that mounts to a structure 12 of the exercise equipment EM and allows flexibility in using the exercise equipment EM. The control panel mount 10 allows the control panel 14 and the display of the control panel to be positioned for use on the exercise equipment EM in multiple orientations thereby enhancing the use of the exercise equipment. For instance, the control panel mount 10 may be mounted to an exercise bike. When the user desires to work out using the pedals and sitting on the seat of the bike, the control panel mount 10 may be folded and oriented so the user sitting on the bike seat has easy access to the control panel 14 with the display in the upright position, for instance, as shown in FIG. 18. When the user desires to work out without sitting on the seat and operating the pedals but instead operate the handles in a back-and-forth motion in the front of the exercise bike, the control panel mount 10 may be extended and repositioned in front of the exercise bike with the display of the control panel rotated and oriented in an upright position allowing the user ease of operation of the exercise machine EM from in front of the exercise machine, for instance as shown in FIG. 19. Also, a non-user of the exercise machine EM can manipulate control panel mount 10, and access the display of the control panel in multiple orientations that do not interfere with the user of the exercise machine, to control, or observe the display of, the exercise machine as needed.

The control panel mount 10 includes a swivel joint 16 and a hinge 18 to allow versatility in displaying and orienting the display of the control panel for the exercise equipment. The control panel mount 10 includes an equipment mounting plate 20 and an intermediate plate 22 connected to each other with the hinge 18. The equipment mounting plate 20 provides a mount to the structural member 12 of the exercise equipment EM or a stand of the exercise equipment. For instance, the equipment mounting plate may have holes 24 that allow the control panel mount to be mounted to the structural member 12 of the exercise machine EM with mechanical fasteners and brackets. The control panel mount 10 also includes a control panel mounting plate 26 that provides a mounting surface for the control panel. The control panel mounting plate 26 may have holes 28 that allow the control panel of the exercise machine to be mounted to the control panel mounting plate with mechanical fasteners. As shown in the drawings, the equipment mounting plate 20 may have raised spacers 30 at the holes 24 to support the equipment mounting plate 20 against the intermediate plate 22. The intermediate plate 22 may have disc members 31 that releasably engage the spacers 30 and serve to releasably lock the intermediate plate with the equipment plate 20. The intermediate plate 22, the control panel mounting plate 26, and the equipment mounting plate 20 may have openings to allow wires for the control panel 14 to pass through the control panel mount 10.

Figure 1:
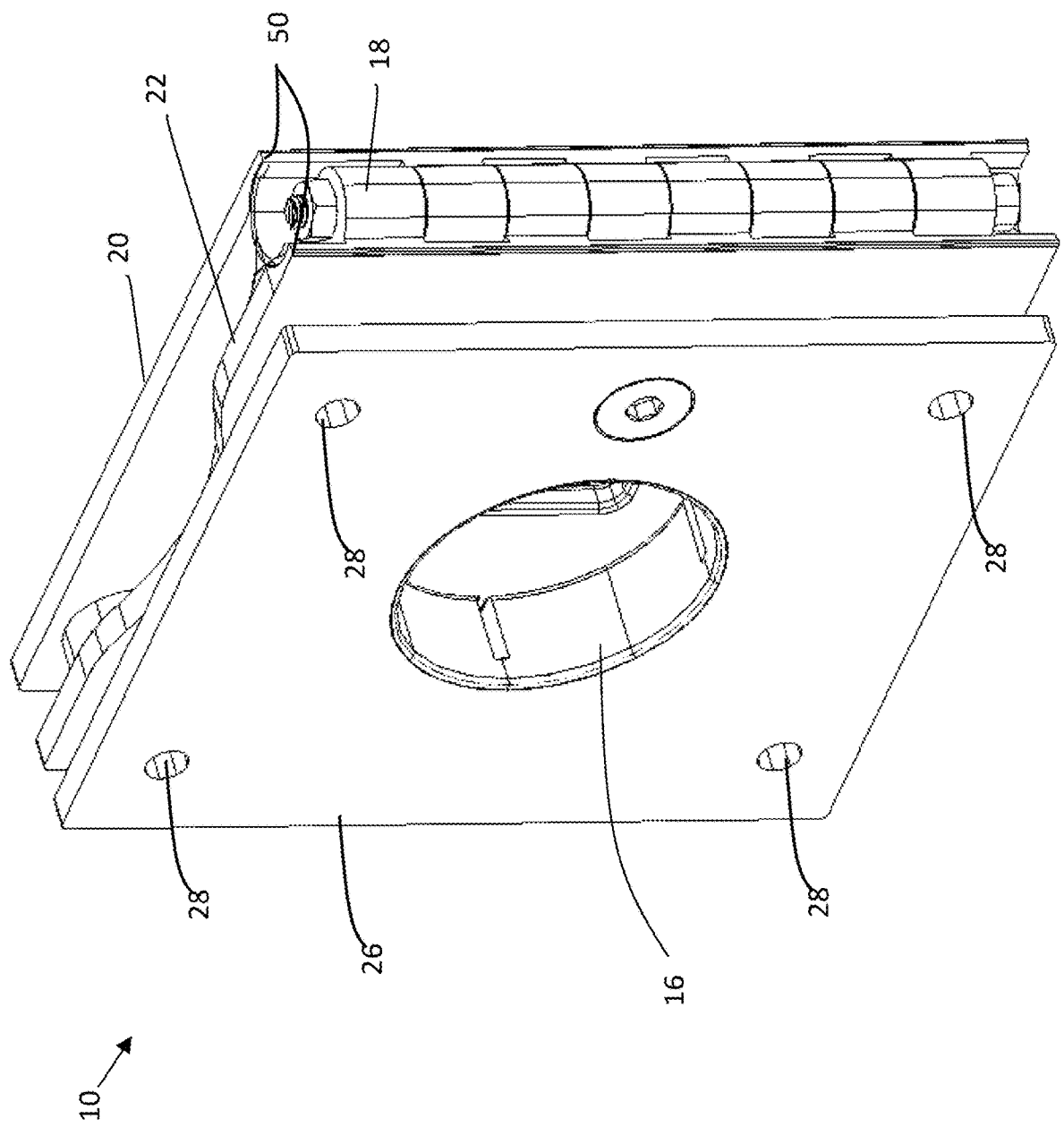
FIG. 1 is a perspective view of the control panel mount.
Figure 5:
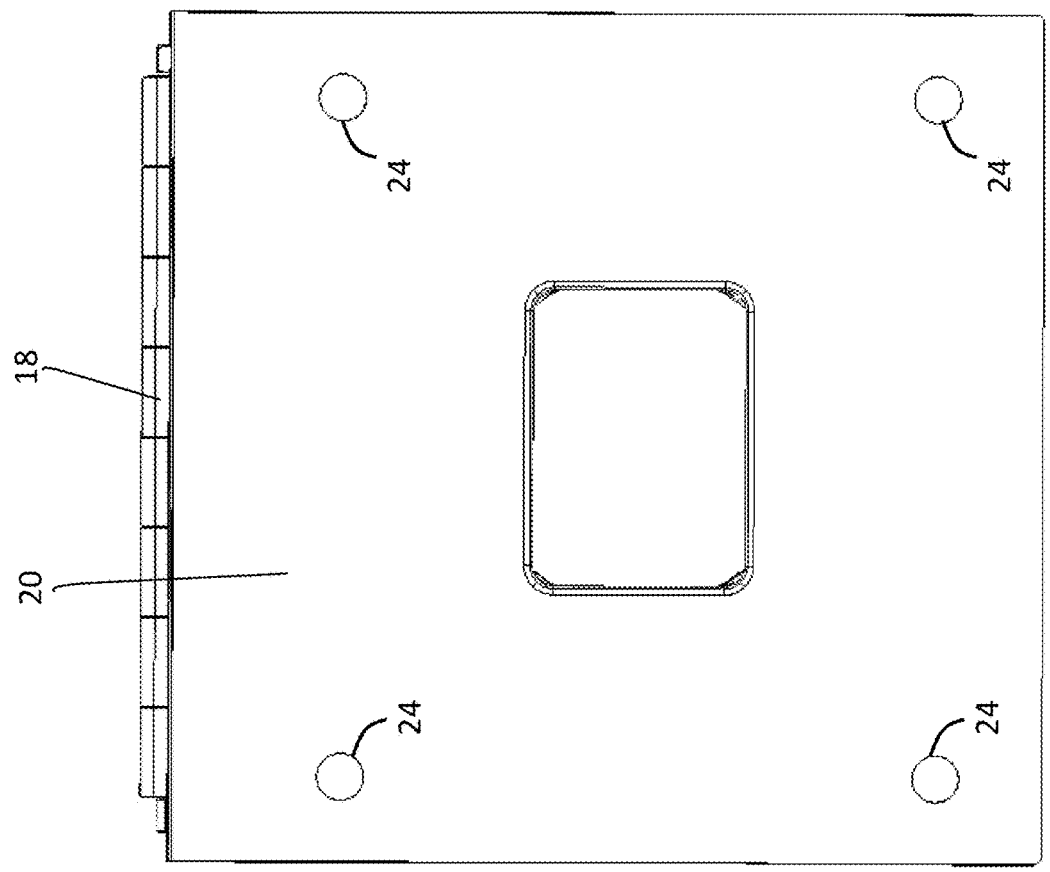
FIG. 5 is a rear view of the control panel mount relative to FIG. 2 with a mounting surface of an equipment mounting plate facing outward.
Figure 4:
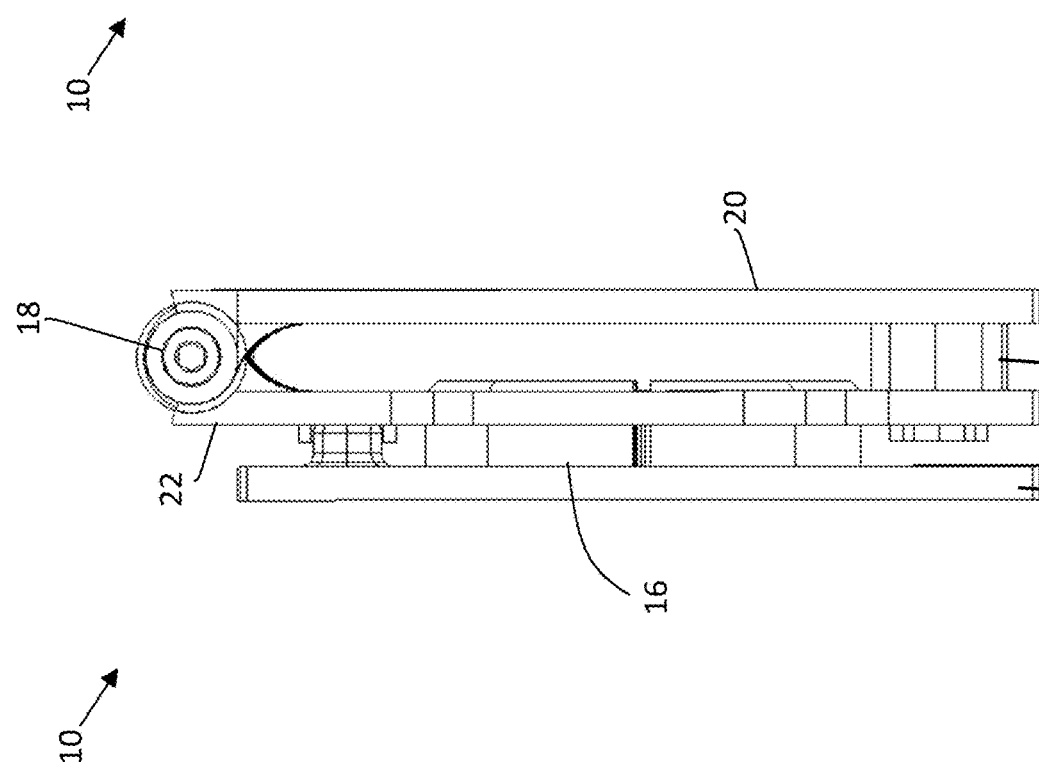
FIG. 4 is a right side view of the control panel mount relative to FIG. 2, the left side being a mirror image thereof.
Figure 6:
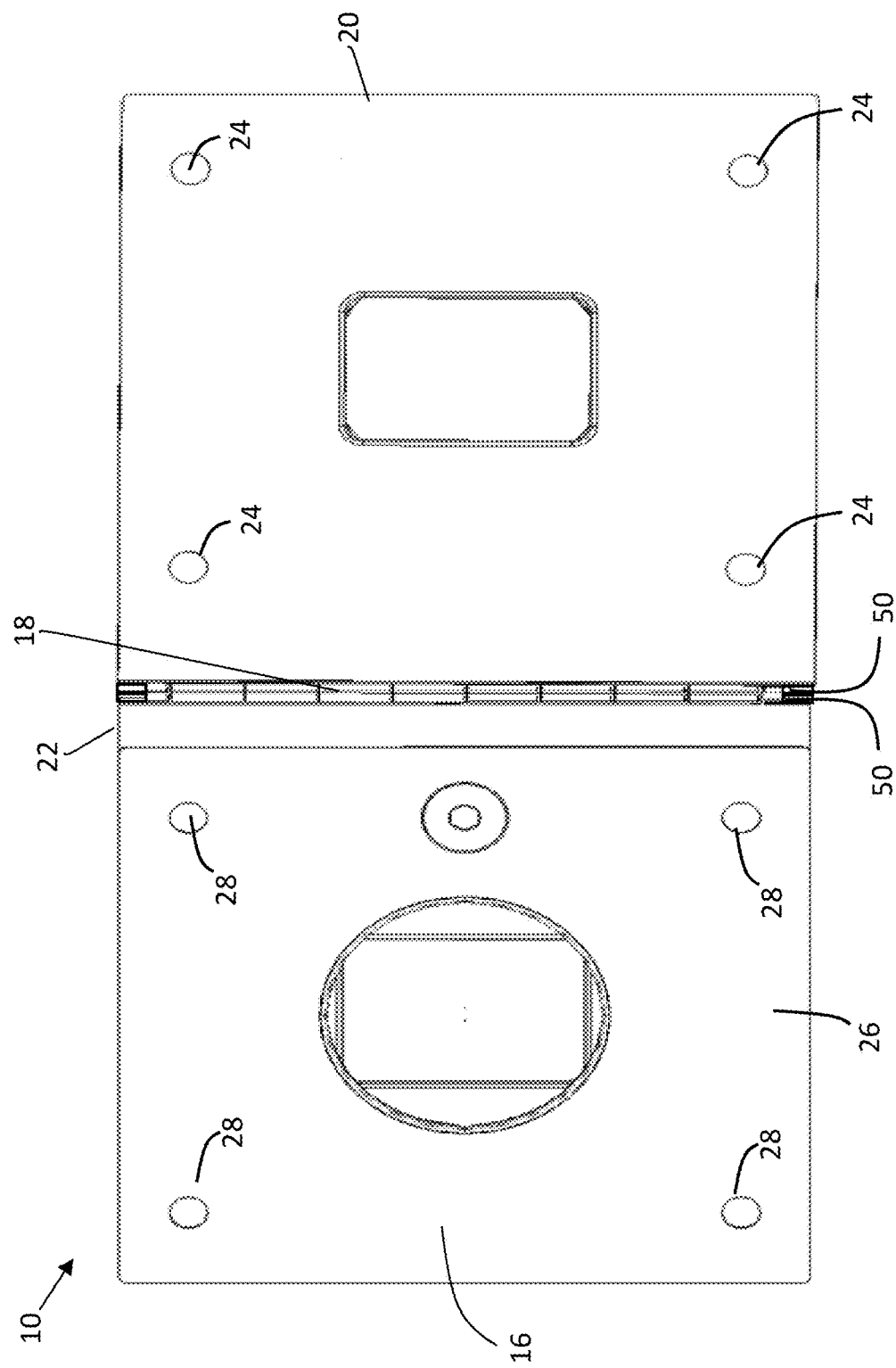
FIG. 6 shows the control panel mount opened about the hinge with the mounting surfaces of the control panel mounting plate and the equipment mounting plate facing outward.
Figure 7:
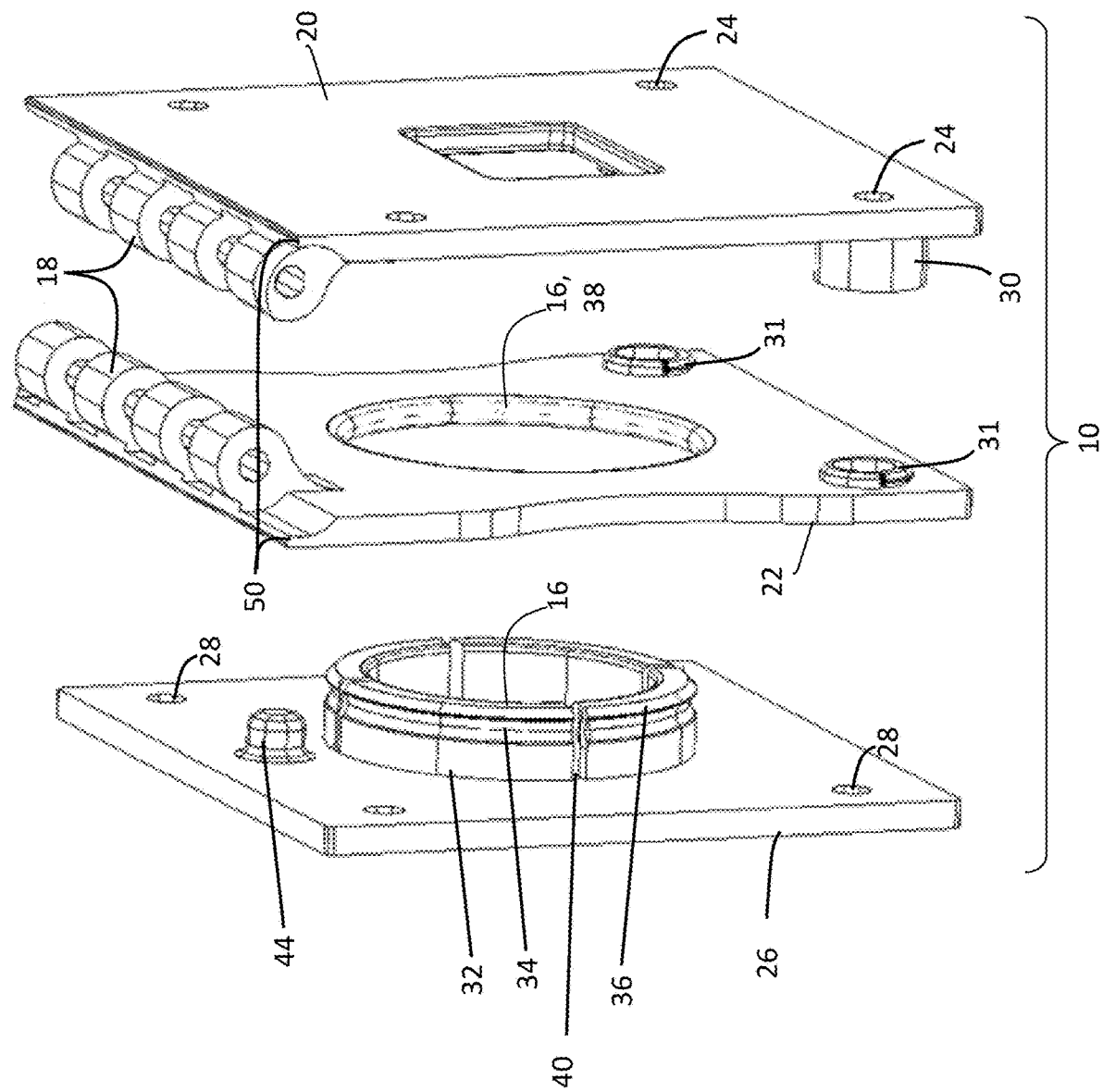
FIG. 7 is an exploded perspective view of the control panel mount.
Figure 8:
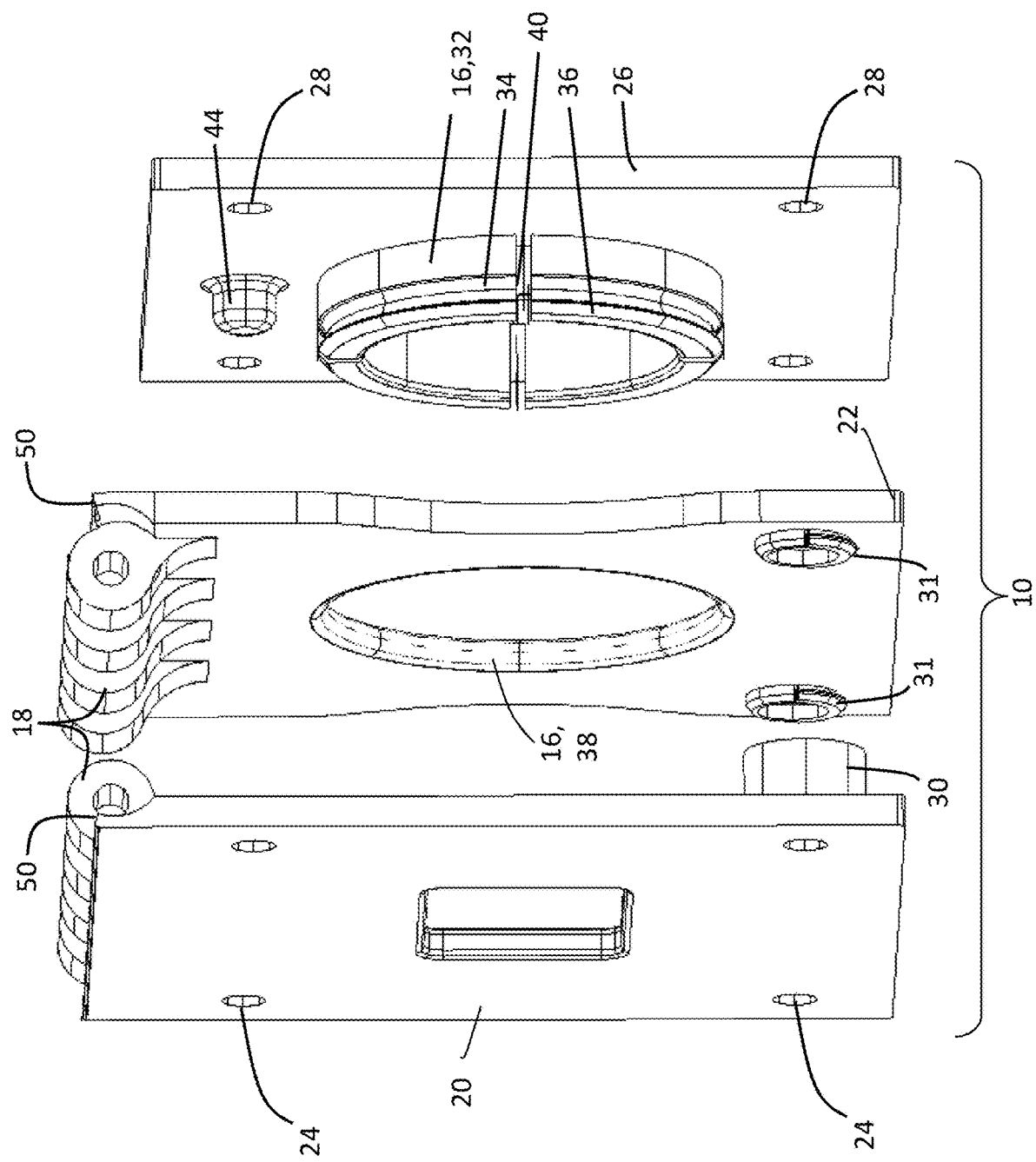
FIG. 8 is another exploded perspective view of the control panel mount.
Figure 9:
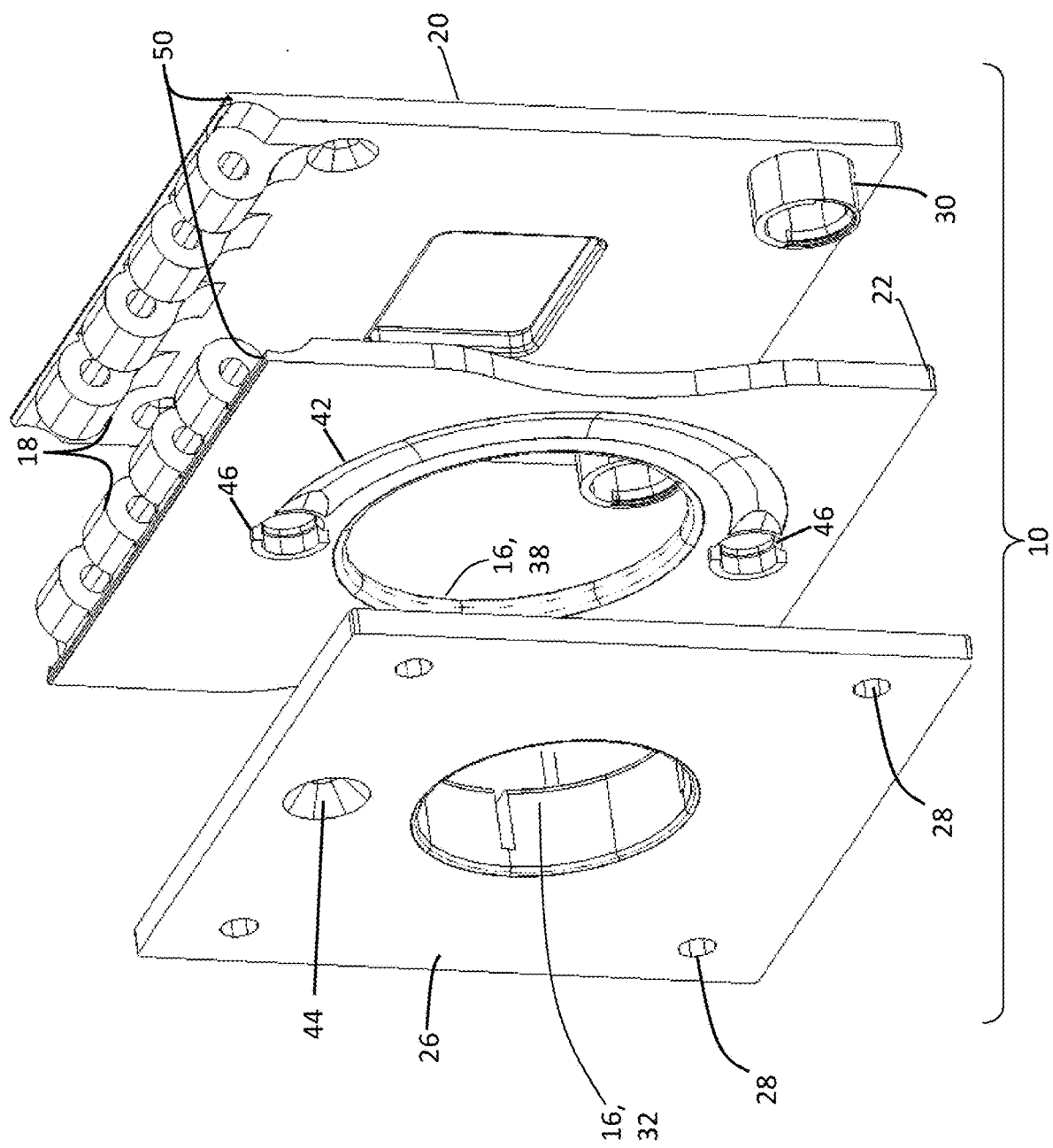
FIG. 9 is another exploded perspective view of the control panel mount.
Figure 10:
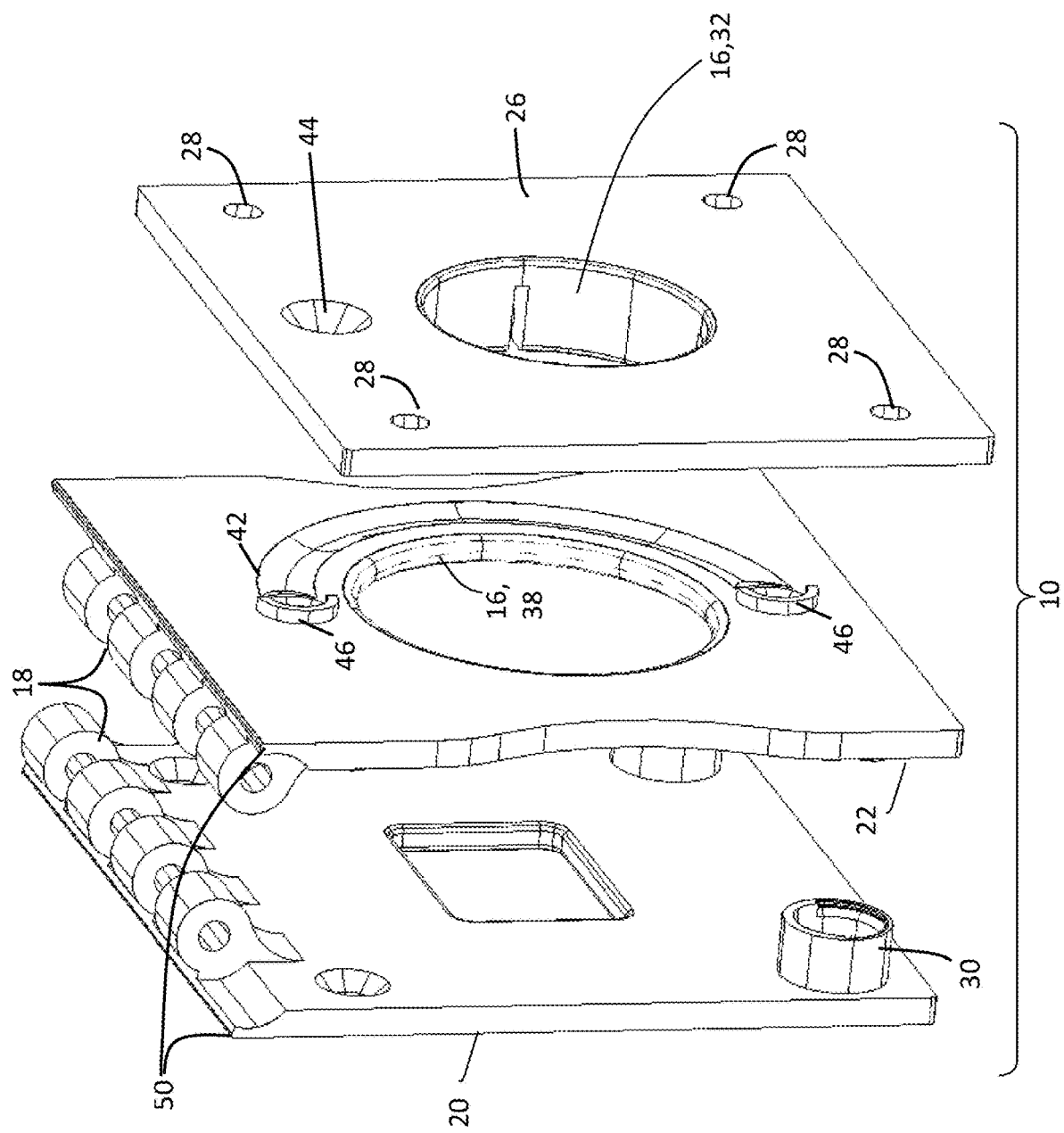
FIG. 10 is another exploded perspective view of the control panel mount.
Figure 12:
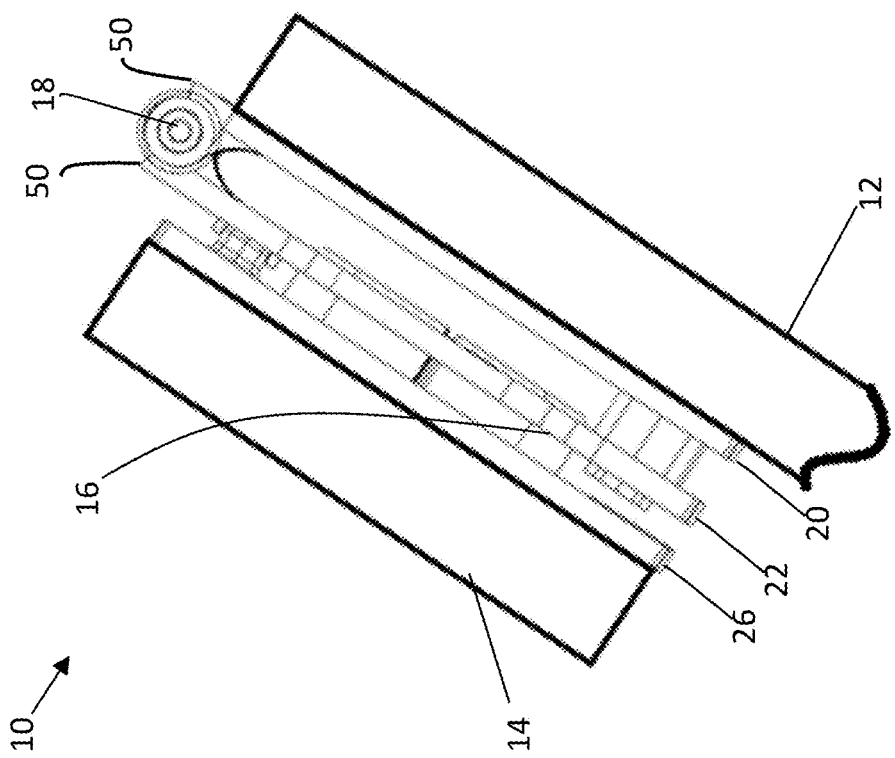
FIGS. 11-19 show a method of using the control panel mount where the control panel mount is connected with an exercise bike and the control panel for the exercise bike is turned and pivoted via the control panel mount to an orientation where the control panel is upright and visible for normal operation in front of the exercise bike thereby allowing use of the exercise bike in an alternate manner of operation.
Figure 11:
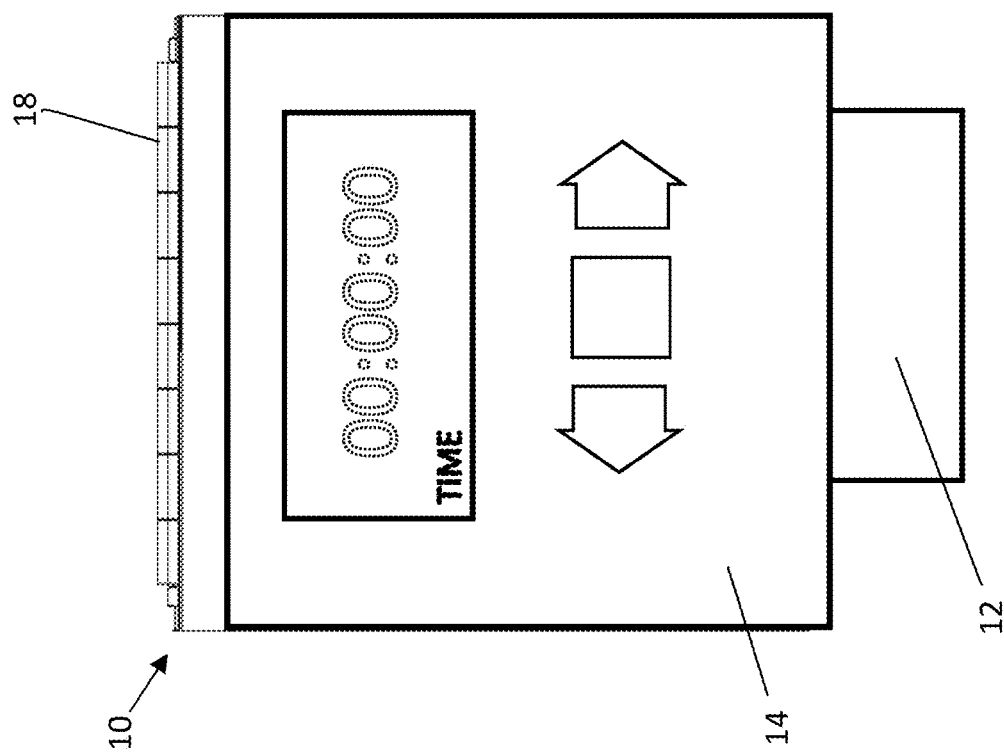
Figure 13:
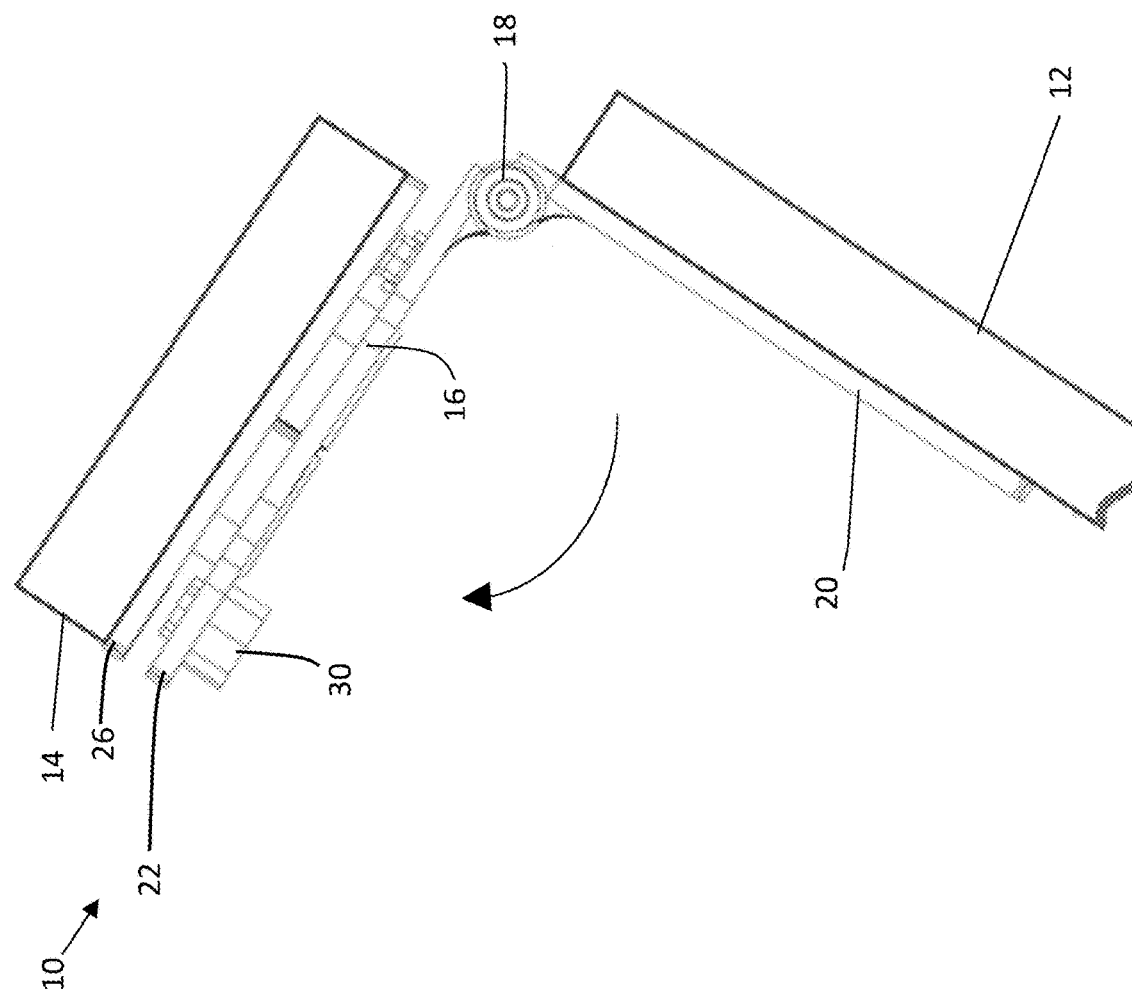
Figure 15:
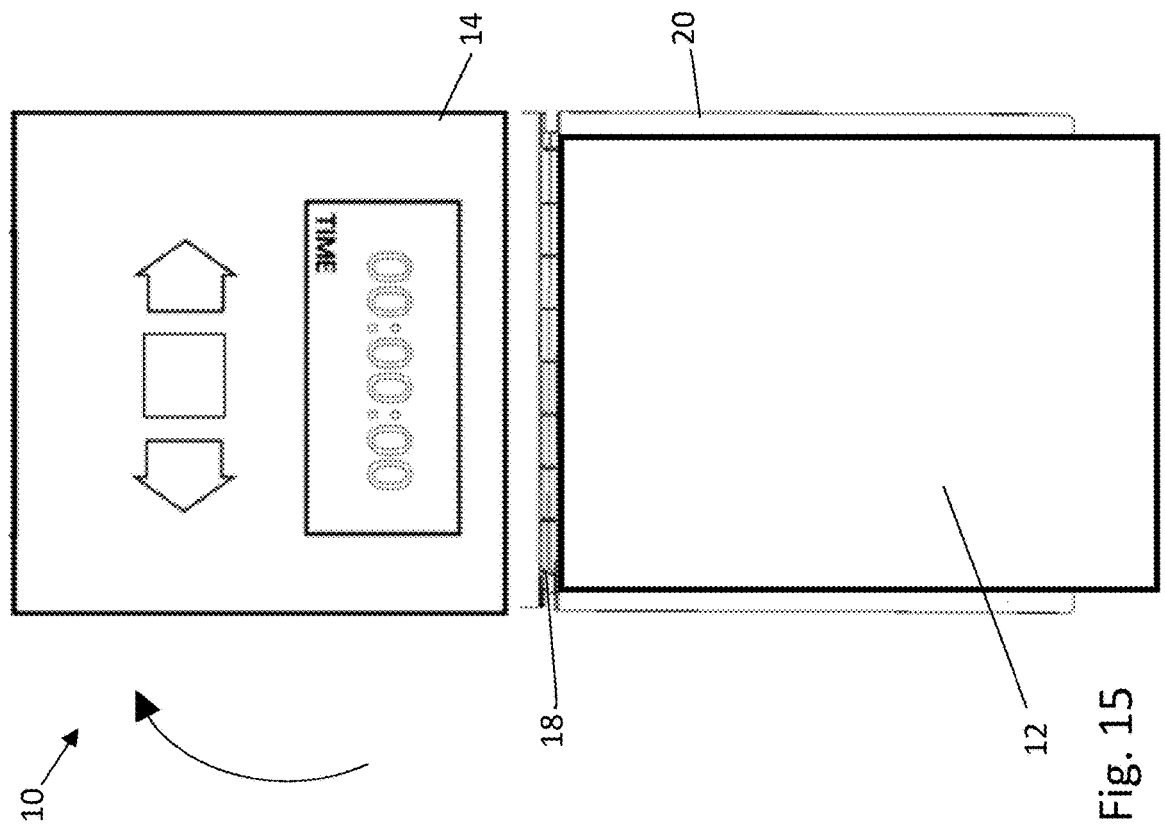
Figure 14:
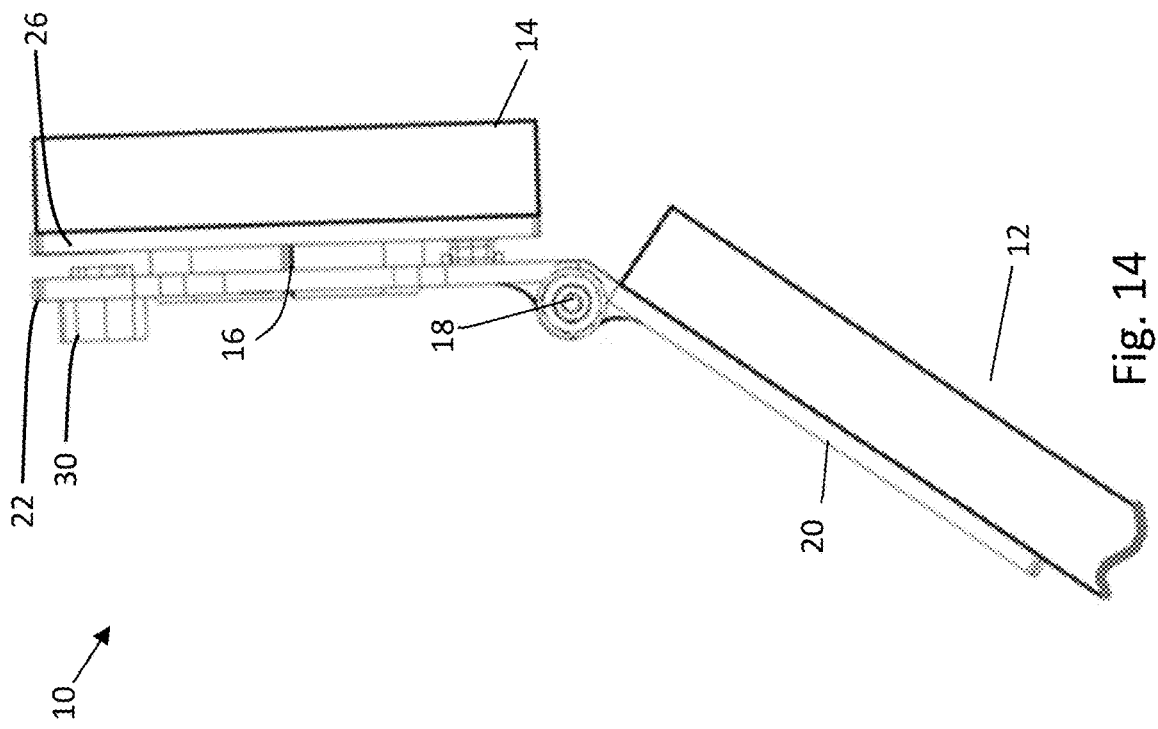
Figure 17:
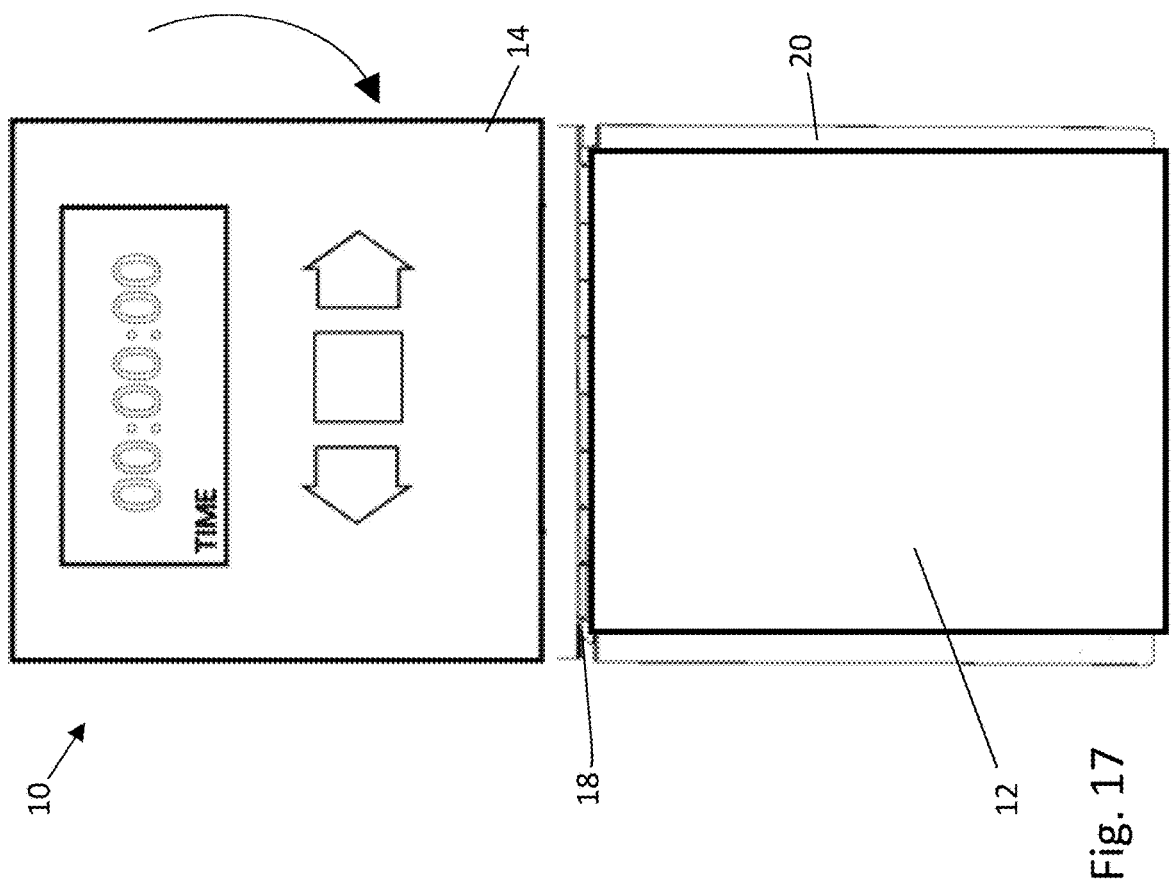
Figure 16:
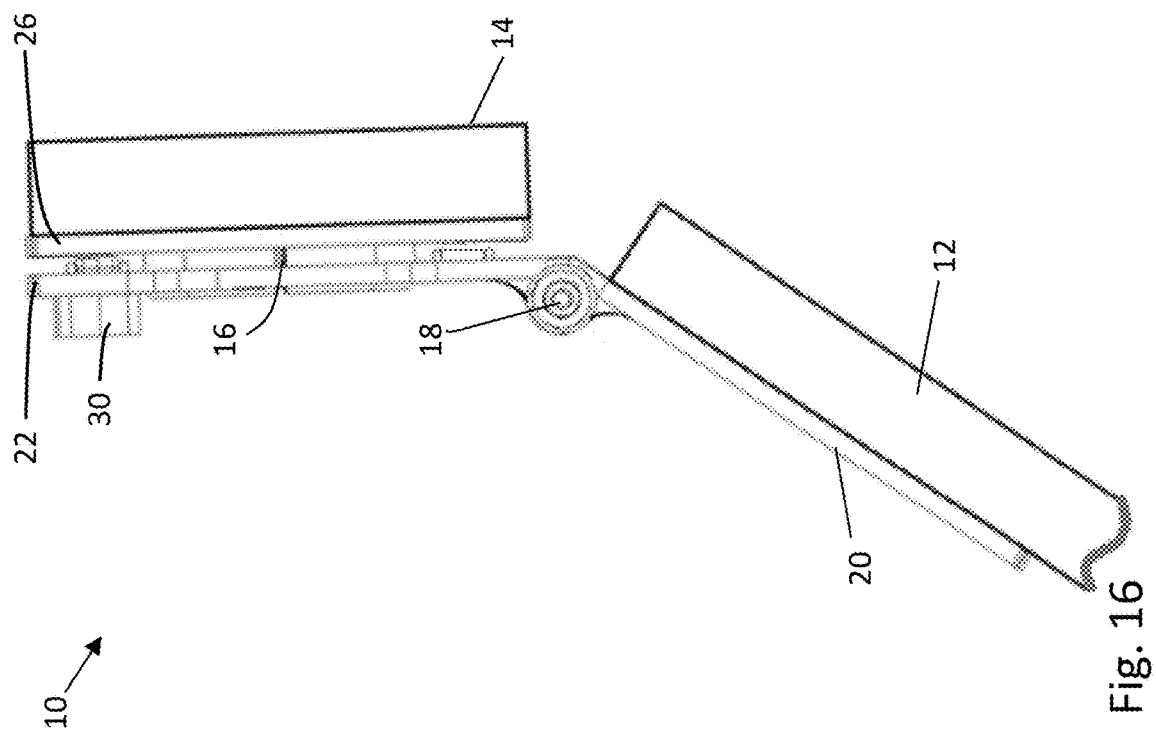

The intermediate plate 22 is connected to the control panel mounting plate 26 with the swivel joint 16. The swivel joint 16 may comprise a rotary bearing assembly extending between the intermediate plate 22 and the control panel mounting plate 26. In the alternative, the intermediate plate 22 and the control panel mounting plate 26 may have one or more cooperating nesting annular flanges that allow relative rotation therebetween. For instance, as shown in the drawings (e.g., FIGS. 7-8), the control panel mounting plate 26 has a hub member 32 projecting from one side opposite the side that serves as a mounting surface for the control panel 14. The distal end of the hub member 32 has a groove 34 and a lip 36 that capture a rounded surface 38 defining the hole on the intermediate plate 22. The hub member 32 may have axial slits 40 to allow the diameter of the hub member to be compressed to rotationally engage the rounded surface 38 defining the hole of the intermediate plate 22. In the alternative, the feature of the hub member 32 with the groove 34 and lip 36 may be provided on the intermediate plate 22, and the engagement surface 38 may define a hole on the control panel mounting plate 26.

To facilitate rotational motion about the swivel joint 16, the intermediate plate 22 may be provided with a track 42, for instance, a semicircular shaped track. A pin 44 extending from the back side of the control panel mounting plate 26 slides within the track 42. The pin 44 may cooperate with sockets 46 formed at the 12 o'clock and 6 o'clock positions in the track 42 to hold the control panel mounting plate 26 in a desired position. The pin 44 may be spring loaded, so when the pin is sliding in the track 42, the pin is compressed with the spring, and when the pin reaches either one of the sockets 46, the spring urges the distal end of the pin to engage the bottom of the socket to hold the control panel mounting plate in a desired position. In the alternative, the feature of the track may be a recess or raised surface that forms a guide. The track may also be provided on the control panel mounting plate and the pin may be provided on the intermediate plate.

Thus, the control panel 14 may be pivoted relative to the structural member 12 of the exercise machine EM via the hinge 18 and rotated relative to the structural member of the exercise machine via the swivel joint 16. As it relates to use of the control panel mount 14 on an exercise bike, when the user desires to use the exercise bike by sitting on the seat and operating the pedals, the control panel mount 10 may be folded about the hinge 18 so that the included surfaces of the intermediate plate 22 and the equipment mounting plate 20 may be placed adjacent to each other in a side-by-side facing orientation. The intermediate plate 22 and the control panel mounting plate 26 may have cooperating lips 50 that extend across the respective plate adjacent to the hinge structure to enable the control panel mount 10 to open to an expanded configuration at a desired angle. The angle may be selected based upon the viewing angles of the mounting structure 12 of the exercise machine. For instance, the lips 50 may be shaped so as to contact each other in a manner to allow the intermediate plate 22 and the control panel mounting plate 26 to form an obtuse angle, for instance, 120 degrees to 165 degrees. In this configuration (as well as any intermediary position from the closed configuration to the expanded or open configuration), the display of the control panel 14 may be swiveled in an upright configuration by rotating the control panel mounting plate 26 relative to the intermediate plate 22 via the swivel joint 16. In this configuration, a non-user wishing to access the control panel may pivot the intermediate plate 22 relative to the equipment mounting plate 20 and/or rotate the control panel mounting plate 26 relative to the intermediate plate 22 to orient the display as desired.

When the user desires to use the exercise bike in another configuration, for instance, from the front of the exercise bike and not sitting on the seat and operating the pedals, the intermediate plate 22 may be pivoted away from the equipment mounting plate 20 so that the included surfaces of the equipment mounting plate and the intermediate plate are spaced apart and generally define planes parallel to each other across the hinge 18. In this configuration, the control panel 14 may be swiveled relative about the swivel joint 16 by rotating the control panel mounting plate 26 relative to the intermediate plate so the display of the control panel 14 is in an upright configuration for the user in front of the exercise bike. In this configuration, a non-user wishing to access the control panel 14 may pivot the intermediate plate 22 relative to the equipment mounting plate 20 and/or rotate the control panel mounting plate 26 relative to the intermediate plate 22 as desired to orient the display as desired.

Wires for the control panel may pass between holes formed in the equipment mounting plate 20, the intermediate plate 22, and the control panel mounting plate 26.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

The invention claimed is:

1. A control panel mount for an exercise machine, the control panel mount having an equipment mounting plate with first and second planar faces, an intermediate plate with first and second faces, and a control panel mounting plate with first and second planar faces, the first planar face of the equipment mounting plate being adapted and configured to be mounted to the exercise machine, the second planar face of the control panel mounting plate being adapted and configured to be mounted to a control panel of the exercise machine, the equipment mounting plate being hingedly connected to the intermediate plate in a manner such that the second planar face of the equipment mounting plate and the first planar face of the intermediate plate are movable between a side by side facing position and an obtusely angled extended position, the second planar face of the intermediate plate being rotatably connected to the first planar face of the control panel mounting plate; and wherein one of the first planar face of the control panel mounting plate and the second planar face of the intermediate plate has a hub structure with a groove, and the other of the first planar face of the control panel mounting plate and the second planar face of the intermediate plate has an engagement surface defining a hole in the respective planar face of the other of the intermediate plate and the control panel mounting plate, the hub structure extends through the hole such that the engagement surface is received in the groove in a manner to provide relative rotation between the control panel mounting plate and the intermediate plate; and wherein one of the first planar face of the control panel mounting plate and the second planar face of the intermediate plate has a track formed as a recess in the respective planar face of the control panel mounting plate and the intermediate plate, the other of the first planar face of the control panel mounting plate and the second planar face of the intermediate plate has a pin projecting from respective planar face of the other of the intermediate plate and the control panel mounting plate, and the pin slides in the track during rotation of the control panel mounting plate relative to the intermediate plate.

2. The control panel of claim 1 wherein the equipment mounting plate and the intermediate plate each have cooperating portions of a hinge formed on a respective edge of the equipment mounting plate and the intermediate plate.

3. The control panel of claim 1 wherein the groove of the hub structure has a lip projecting outward from a distal end of the hub structure, the lip engages the adjacent to the engagement surface defining the hole.

4. The control panel of claim 1 wherein the hub structure has at least one axial slit adapted and configured to allow the hub structure to radially compress.

5. The control panel of claim 1 wherein the track has a semicircular shape.

6. The control panel of claim 5 wherein the track has a socket that engages the pin in a manner to limit rotation of the control panel mounting plate relative to the intermediate plate.

7. The control panel of claim 1 wherein at least one of the equipment mounting plate and the intermediate plate each has a lip adjacent to the cooperating portions of the hinge to support the second planar face of the equipment mounting plate and the first planar face of the intermediate plate in the obtusely angled extended position.

8. A control panel mount for an exercise machine, the control panel mount having an equipment mounting plate, an intermediate plate and a control panel mounting plate, the equipment mounting plate being adapted and configured to be mounted to the exercise machine, the control panel mounting plate being adapted and configured to be mounted to a control panel of the exercise machine, the equipment mounting plate and the intermediate plate having a hinge connection, the hinge connection being adapted and configured to allow the intermediate plate to be moved relative to the equipment mounting plate about the hinge connection between a first position in which the equipment mounting plate and the intermediate plate face each other in a side-by-side, stacked arrangement to a second position in which the equipment mounting plate and the intermediate plate extend out from one another in an extended arrangement, the control panel mounting plate and the intermediate plate having a swivel connection, the swivel connection being adapted and configured to the allow the control mounting plate to rotate relative to the intermediate plate in a manner such that when the control panel of the exercise machine is mounted to the control panel mounting surface, the swivel connection is configured to allow the control panel to be moved between a right side up configuration and an upside down configuration with the intermediate plate and the equipment plate in the first position, the second position and another position between the first position and the second position; and wherein the swivel connection comprises a hub structure on one of the control panel mounting plate and the intermediate plate, the hub structure has a groove, and the other of the control panel mounting plate and the intermediate plate has an engagement surface defining a hole, the hub structure extends through the hole such that the engagement surface is received in the groove in a manner to provide relative rotation between the control panel mounting plate and the intermediate plate; and wherein the swivel connection further comprises a track formed on one of the control panel mounting plate and the intermediate plate and a pin projecting from the other of the control panel mounting plate and the intermediate plate, and the pin slides in the track during relative rotation of the control panel mounting plate relative to the intermediate plate.

9. The control panel of claim 8 wherein the groove has a lip projecting outward from a distal end of the hub structure, the lip engages adjacent to the engagement surface defining the hole.

10. The control panel of claim 8 wherein the track of the intermediate plate has a semicircular shape.

11. The control panel of claim 8 wherein the track has a socket that engages the pin in a manner to limit rotation of the control panel mounting plate relative to the intermediate plate.

12. The control panel of claim 8 wherein at least one of the equipment mounting plate and the intermediate plate each has a lip adjacent to the cooperating portions of the hinge connection to support the equipment mounting plate and the intermediate plate in the extended arrangement.

13. The control panel of claim 8 wherein the hub structure has at least one axial slit adapted and configured to allow the hub structure to radially compress.

* * * * *